April 8, 1958   K. A. McCOLLOM ET AL   2,830,191
PULSE-PRODUCING APPARATUS FOR CALIBRATING DETONATION METERS
Filed Nov. 5, 1951                                     2 Sheets-Sheet 1

INVENTORS.
K. A. McCOLLOM
D. R. DE BOISBLANC
BY
Hudson and Young
ATTORNEYS

2,830,191
Patented Apr. 8, 1958

2,830,191

PULSE-PRODUCING APPARATUS FOR CALIBRATING DETONATION METERS

Kenneth A. McCollom and Deslonde R. De Boisblanc, Idaho Falls, Idaho, assignors to Phillips Petroleum Company, a corporation of Delaware Application November 5, 1951, Serial No. 254,962

6 Claims. (Cl. 250—214)

This invention relates to a circuit and apparatus for producing spaced sets of pulses. In another aspect, it relates to a circuit for calibrating a detonation meter.

In the copending application of Kenneth A. McCollum et al., filed April 19, 1951, Serial No. 221,928, now Patent 2,715,832, granted August 23, 1955, entitled Engine Analyzer, and in the copending application filed October 31, 1949, Serial No. 124,667, now Patent 2,679,746, granted June 1, 1954, to D. R. de Boisblanc, entitled Detonation Analyzer, there is shown an instrument for determining the time interval between the occurrence of detonation in an internal combustion engine and a reference time occurring during each cycle of cylinder operation. Preferably and advantageously, the reference time can be the time at which the spark impulse occurs in the cylinder under test. In this case, the interval measured is that between the occurrence of the spark and the occurrence of detonation during each cycle of cylinder operation. Alternatively, the reference time can be the time at which the low frequency wave representing the rate of change of pressure in the cylinder due to normal burning of the fuel reaches its maximum value. In this case, the interval measured is that between the time of occurrence of said maximum value and the time of occurrence of detonation during each cycle of cylinder operation.

In order to calibrate this detonation measuring instrument, it is desirable to produce a number of sets of pulses, each corresponding in duration to one cycle of cylinder operation of a test engine under standard conditions. Each set consists of two pulses, one representing the time of occurrence of the detonation and the other representing the time of occurrence of the index variable, which can be the spark, or the time of occurrence of the maximum value of the rate of pressure change. When these two pulses in each set are spaced along the time axis a predetermined distance apart, the output of the calibrating device can be fed to one of the aforementioned detonation-measuring instruments to effect a quick and accurate calibration thereof.

Although it is a major purpose of our invention to provide such a calibrating device, various combinations of circuit elements and mechanical parts described and claimed in this application have independent utility in other fields, as those skilled in the art will understand.

It is an object of the invention to provide a circuit for calibrating a detonation measuring instrument which measures the time interval between the occurrence of detonation and a reference time during each cycle of cylinder operation.

It is a further object to provide a pulse-producing circuit of novel and improved character.

It is a still further object to provide a circuit which is simple in construction, reliable in operation, and has a minimum number of standard circuit components.

Various other objects, advantages and features of the invention will become apparent from the following detailed description taken in conjunction with the accompanying drawings, in which.

Figure 1:
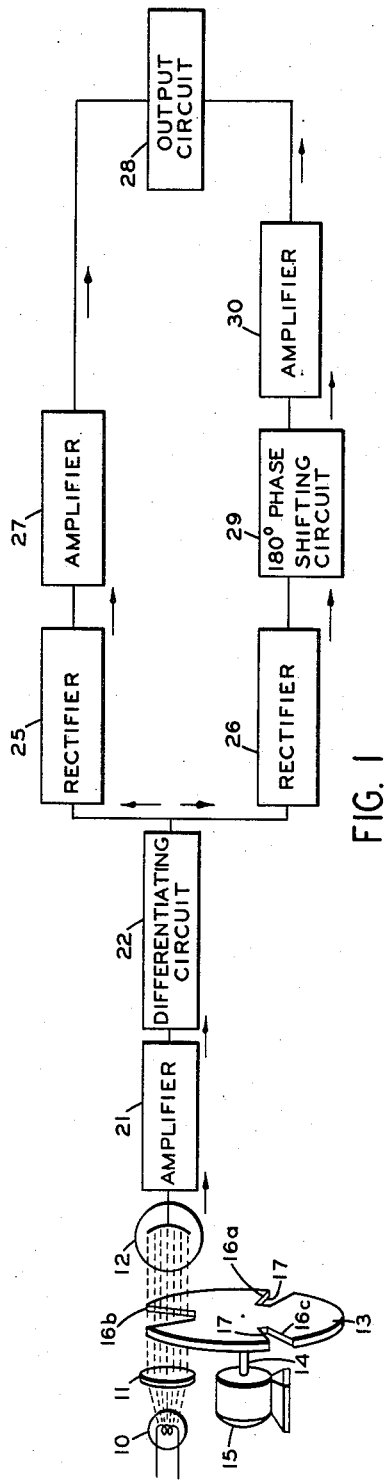
Figure 1 is a block diagram of the calibrating device of our invention.

Referring now to Figure 1, a light beam is produced by a source 10, preferably a point source, the beam being focused by a lens 11 upon a photoelectric cell 12. The lens 11 has such properties that the light beam passing therefrom consists, effectively, of parallel rays. Interposed in the path of the light beam is a circular shutter 13 mounted upon a rotatable shaft 14 which is driven by a motor 15. Shutter 13 is provided with a series of slots 16a, 16b and 16c which are spaced at equal angular intervals about the circumference of the shutter. The walls 17 defining the slots lie along radii of the shutter 13. As a result, the output of photoelectric cell 12 is a series of rectangular waves, the leading edge of which is produced when one of the radially extending walls 16a of a given slot moves out of the path of the light beam, and the trailing edge being produced when the other radially extending wall of such slot interrupts the light beam.

In accordance with the invention, the width of the slots 16 and the speed of rotation of the motor 15 are so adjusted that the time interval between succeeding rectangular waves is equal to the time required for a complete cycle of cylinder operation of a test engine operated under standard conditions. Furthermore, the width of the slots 16 is such that there is a preselected time interval between the leading edge and trailing edge of each rectangular wave, this time interval being selected so as to represent a standard interval between the time of occurrence of detonation and the time of occurrence of a reference event, such as the spark, in a test cylinder of an internal combustion engine. Of course, where other applications are made of the circuit, the width of the rectangular waves and the interval between them can be adjusted to suit the particular conditions encountered.

Figure 3A:
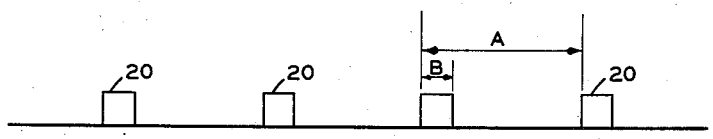
Figures 3a to 3f, inclusive, are graphs illustrating the wave forms at various parts of the circuit of Figures 1 and 2, the abscissa in each case representing time and the ordinate representing amplitude.

The output of photoelectric cell 12 is represented by the rectangular waves 20, Figure 3a. In this figure, the interval A, which represents the time between successive rectangular waves, corresponds to a complete cycle of cylinder operation, and the interval B, which is the width of the rectangular wave, represents the time interval between the occurrence of detonation and the occurrence of spark or other reference event in a cylinder of a test engine.

Figure 3B:
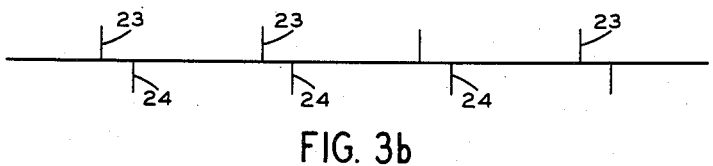

The output of the cell 12 is fed through an amplifier 21 to a differentiating circuit 22, which produces an output representing the time rate of change of amplitude of the rectangular waves 20. Accordingly, the output of this circuit is a series of sharp pulses 23, Figure 3b, of one polarity corresponding in time with the leading edges of the rectangular waves 20 together with a series of sharp pulses 24 of opposite polarity corresponding in time with the trailing edges of the respective rectangular waves 20.

The output of differentiating circuit 22 is fed to a pair of rectifiers 25 and 26 of opposite polarity. Rectifier 25 passes only the negative pulses 24 and eliminates positive pulses 23 while rectifier 26 passes the positive pulses 23 and rejects the negative pulses 24.

Figure 3C:

The output of rectifier 25 is fed through an amplifier 27 to an output circuit 28. Assuming that the amplifier 27 has an odd number of stages, such as one, the negative pulses 24 are inverted, that is, shifted in phase through an angle of 180°, and appear as positive pulses 24a, Figure 3c, at the output of amplifier 27. Likewise, these pulses appear with the same polarity in the output circuit 28, as indicated by pulses 24a in Figure 3f.

Figure 3D:
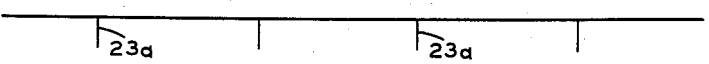
Figure 3E:

The output of rectifier 26 is fed, in succession, through a 180° phase shifting circuit 29 and an amplifier 30 to the output circuit 28. Positive pulses 23 are inverted or shifted through a phase angle of 180° by the circuit 29 and appear as negative pulses 23a, Figure 3d, at the output of this circuit. Assuming that amplifier 30 has an odd number of stages, such as one, the pulses 23a are again inverted or shifted in phase through an angle of 180°, and appear again as positive pulses 23b, Figure 3e, at the output of amplifier 30 and at the output of circuit 28, as indicated by Figure 3f.

Figure 3F:
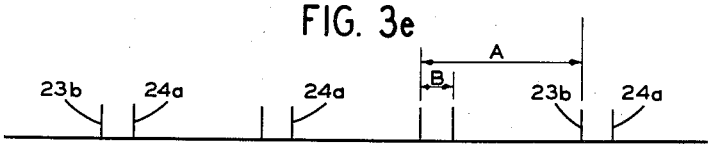

It will be evident that the output of circuit 28 consists of successive sets 23b, 24a of sharp pulses, each set being separated by the distance A, Figures 3a and 3f, representing the time interval between successive cycles of cylinder operation, the pulses 23b, 24a of each set being separated by the distance B, Figure 3a and 3f, representing the width of rectangular waves 20 and the time interval between occurrence of detonation and the occurrence of spark or other index variable in an internal combustion engine. It will be evident, therefore, that the pulses 23b, 24a can be fed to an instrument of the type disclosed by the aforementioned copending applications to readily and quickly calibrate same.

Figure 2:
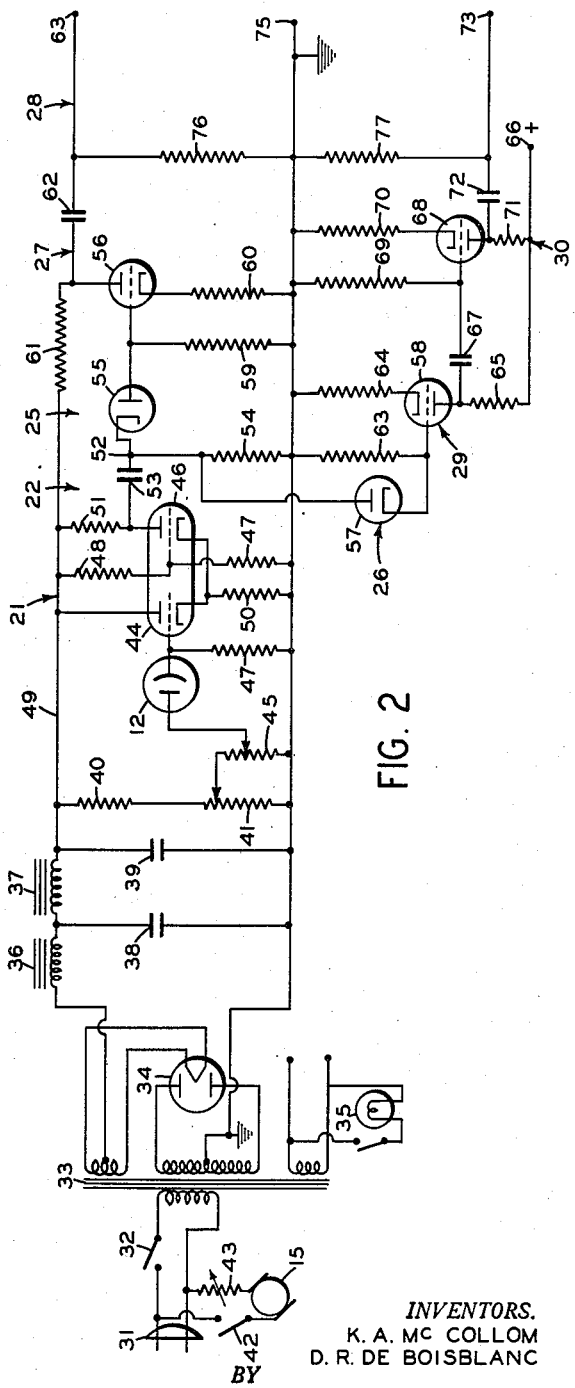
Figure 2 is a schematic circuit diagram of the electrical elements of Figure 1.

A detailed circuit construction in accordance with the block diagram of Figure 1 is shown by Figure 2. This circuit includes a conventional power supply including a line plug 31, switch 32, power transformer 33, rectifier 34, pilot light 35, filter chokes 36, 37, filter condensers 38, 39 and bleeder resistances 40, 41. It will be noted that the motor 15 is connected to line plug 31 through a switch 42 and rheostat 43, the latter device permitting the speed of the motor to be readily adjusted.

The photoelectric cell 12 has its cathode connected to the control grid of a triode 44 and its anode connected to the contactor of a potentiometer 45 which, in turn, is connected between ground and a tap on bleeder resistance 41. Tube 44 and a tube 46 constitute the amplifier 21, Figure 1, the control grid of each tube being provided with a grid resistance 47, and a constant potential being maintained upon the control grid of tube 46 by a resistor 48 connected to a positive power supply line 49. The anode of tube 44 is connected directly to line 49 while its cathode is connected directly to the cathode of tube 46 and to ground through a bias resistor 50. The anode of tube 46 is connected to line 49 through a resistance 51 and to a terminal 52 through a condenser 53. It will be apparent that the tubes 44, 46 function as voltage amplifiers with the output thereof appearing at the anode of tube 46.

Resistor 51 and condenser 53 constitute the differentiating circuit 22 of Figure 1 and the time constant of this circuit is so selected as to provide a sharp pulse when the amplified leading or trailing edge of a rectangular wave is impressed upon the circuit. To this end, resistance 51 can have value of 100,000 ohms and condenser 53 can have a value of .0001 microfarad. The differentiated pulses appear between terminal 52 and ground, a fixed resistance 54 being provided between these points.

Terminal 52 is connected to the cathode of a rectifier tube 55, the anode of which is connected to the control grid of a tube 56. Terminal 52 is also connected to the anode of a rectifier tube 57, the cathode of which is connected to the control grid of a tube 58. Rectifier tube 55 passes pulses of negative polarity but rejects pulses of positive polarity while rectifier tube 57 passes pulses of positive polarity but rejects pulses of negative polarity.

Tube 56 is included in amplifier 27, the tube being provided with a grid resistor 59, a cathode bias resistor 60, and an anode voltage dropping resistor 61. The output of amplifier tube 56, which is inverted in phase with respect to its input, is fed through a coupling condenser 62 to an output terminal 63 of the output circuit 28.

Amplifier tube 58 forms a part of the phase shifting circuit 29 and is provided with a grid resistor 63, a cathode biasing resistor 64, and an anode voltage dropping resistor 65 connected to a positive power supply terminal 66. The output of this tube, which is inverted in phase with respect to its input, is fed through a coupling condenser 67 to the control grid of a tube 68 forming a part of the amplifier 30. Tube 68 is provided with a grid resistor 69, a cathode bias resistor 70 and an anode voltage dropping resistor 71, the output being taken from the anode of the latter tube and passed through a coupling condenser 72 to a terminal 73 forming a part of output circuit 28.

It will be noted that phase shifting is accomplished in the described circuit by utilizing one amplifier stage between the output of rectifier 25 and the circuit 28 while two stages are inserted between the output of rectifier 26 and circuit 28, each stage providing a phase shift of 180°. Since the differentiated pulses fed through the rectifiers 25, 26 are originally of opposite polarity, and there is one more stage in the amplifier associated with one rectifier than in the amplifier associated with the other rectifier, the outputs of the amplifiers will have the same phase relationship. This holds true if the number of stages in the two amplifiers differ by 3 or any other odd integer. Of course, other types of phase shifting circuits can be utilized, such as resistance-capacitance circuits, rather than the particular arrangement of amplifier tubes herein disclosed.

The output circuit 28 includes a ground terminal 75, a fixed resistance 76 connected between terminals 63, 75 and a fixed resistance 77 connected between the terminals, 73, 75. It will be understood, therefore, that the output of the amplifiers 27, 30 can be separately withdrawn, if desired, or these outputs can be combined if such is desirable.

It will be apparent that we have achieved the objects of our invention in providing a calibrating circuit for instruments wherein the time interval between a reference event and the occurrence of detonation is measured during each cycle of operation of a test engine. Furthermore, we have shown a pulse producing circuit and associated rectangular wave generator which have independent utility aside from the calibration of detonation measuring instruments.

While the invention has been described in connection with a present, preferred embodiment thereof, it is to be understood that this description is illustrative only and is not intended to limit the invention.

We claim:

1. Apparatus for producing spaced sets of pulses, each set including a pair of spaced pulses, which comprises, in combination, a photoelectric cell, a light source trained on said cell, means for periodically interrupting the beam from said light source to produce a rectangular wave photoelectric cell output, a differentiating circuit fed by said cell to produce pulses of one polarity at the beginning of each rectangular wave and pulses of opposite polarity at the end of each rectangular wave, a pair of rectifiers of opposite polarity fed by said differentiating circuit for separating said differentiated pulses, a first amplifier responsive to one set of rectified pulses, and a second amplifier responsive to the other set of rectified pulses, the number of stages in one amplifier being greater than the number of stages in the other amplifier by an odd integer.

2. Apparatus for producing spaced sets of pulses, each set including a pair of spaced pulses, which comprises, in combination, a photoelectric cell, a light source trained on said cell, a circular shutter having a plurality of radial slots formed therein interposed between said source and said cell, means for rotating said shutter to produce a rectangular wave photoelectric cell output, the width of said slots and the speed of said motor being so adjusted that the width of said rectangular waves represents the desired time interval between each pair of pulses and the interval between rectangular waves represents the desired time interval between sets of pulses, and said shutter constituting the sole impediment between said source and said cell, an amplifier fed by said photoelectric cell, a differentiating circuit fed by said amplifier, a pair of rectifiers of opposite polarity fed by said differentiating circuit, a first amplifier responsive to the output of one rectanfier, and a second amplifier responsive to the output of the other rectifier, the number of stages in said first and second amplifiers differing by an odd integer.

3. Apparatus for producing spaced sets of pulses, each set including a pair of spaced pulses, which comprises, in combination, a photoelectric cell, a light source trained on said cell, a circular shutter having a plurality of radial slots formed therein interposed between said source and said cell, means for rotating said shutter to produce a rectangular wave photoelectric cell output, the width of said slots and speed of said motor being so adjusted that the width of said rectangular waves represents the desired time interval between each pair of pulses and the interval between rectangular waves represents the desired time interval between sets of pulses, an amplifier fed by said photoelectric cell, a differentiating circuit fed by said amplifier, a pair of rectifiers of opposite polarity fed by said differentiating circuit, the output of one rectifier being differentiated pulses of one polarity representing the leading edges of said rectangular waves, the output of the other rectifier having differentiated pulses of opposite polarity representing the trailing edges of said rectangular waves, an output circuit, means for feeding one set of differentiated pulses to said output circuit, and means of inverting the other set of differentiated pulses with respect to said one set then feeding the inverted pulses to said output circuit.

4. Apparatus for calibrating a detonation meter wherein a time interval is measured, in each of a number of operating cycles, between an electrical pulse representing detonation and an electrical impulse representing an index time, said apparatus including a photoelectric cell, means for directing a beam of parallel light rays upon said cell, a circular shutter having a plurality of slots formed therein, the edges of said slots being defined by radii of said shutter, and said shutter being interposed in said light beam, means for rotating said shutter, the width of said slots and the speed of said rotating means being so adjusted that the width of said rectangular waves represents a predetermined interval corresponding to the interval between the occurrence of said index time and detonation in an internal combustion engine under standard conditions, and the interval between said rectangular waves corresponding to the time required for a single complete cycle of cylinder operation, and said shutter constituting the sole impediment between said source and said cell, and a circuit fed by said photoelectric cell to produce sharp electrical pulses at times corresponding to the beginning and end of each rectangular wave.

5. Apparatus for calibrating a detonation meter wherein a time interval is measured, in each of a number of operating cycles, between an electrical pulse representing detonation and an electrical impulse representing the spark, said apparatus including a photoelectric cell, means for directing a beam of parallel light rays upon said cell, a circular shutter having a plurality of slots formed therein, the edges of said slots being defined by radii of said shutter, and said shutter being interposed in said light beam, means for rotating said shutter, the width of said slots and the speed of said rotating means being so adjusted that the width of said rectangular waves represents a predetermined interval corresponding to the interval between the occurrence of spark and detonation in an internal combustion engine under standard conditions, and the interval between said rectangular waves corresponding to the time required for a single complete cycle of cylinder operation, a differentiating circuit fed by said photoelectric cell, a pair of rectifiers of opposite polarity fed by said differentiating circuit, the output of one rectifier being differentiated pulses of one polarity representing the leading edges of said rectangular waves and the output of the other rectifier being differentiated pulses of opposite polarity representing the trailing edges of said rectangular waves, an output circuit, means for feeding one set of differentiated pulses to said output circuit, and means for inverting the other set of differentiated pulses with respect to said one and then feeding the inverted pulses to said output circuit.

6. Apparatus for calibrating a detonation meter wherein a time interval is measured, in each of a number of operating cycles, between an electrical pulse representing detonation and an electrical impulse representing the spark, said apparatus including a photoelectric cell, means for directing a beam of parallel light rays upon said cell, and a circular shutter having a plurality of slots formed therein, the edges of said slots being defined by radii of said shutter, and said shutter being interposed in said light beam, means for rotating said shutter, the width of said slots and the speed of said rotating means being so adjusted that the width of said rectangular waves represents a predetermined interval corresponding to the interval between the occurrence of spark and detonation in an internal combustion engine under standard conditions, the interval between said rectangular waves corresponding to the time required for a single complete cycle of cylinder operation.

References Cited in the file of this patent

UNITED STATES PATENTS

| Number | Name | Date |
| --- | --- | --- |
| 1,640,393 | Coblentz | Aug. 30, 1927 |
| 2,061,734 | Kell | Nov. 24, 1936 |
| 2,113,214 | Luck | Apr. 5, 1938 |
| 2,227,147 | Lindsay | Dec. 31, 1940 |
| 2,262,362 | Gulliksen | Nov. 11, 1941 |
| 2,266,401 | Reeves | Dec. 16, 1941 |
| 2,477,821 | Potts | Aug. 2, 1949 |
| 2,488,430 | Offner | Nov. 15, 1949 |
| 2,491,591 | Sweeney | Dec. 20, 1949 |
| 2,515,630 | Chang | July 18, 1950 |
| 2,671,128 | Zworykin et al. | Mar. 2, 1954 |